(12) United States Patent
Kim

(10) Patent No.: US 11,934,227 B2
(45) Date of Patent: Mar. 19, 2024

(54) DISPLAY DEVICE

(71) Applicant: Samsung Display Co., LTD., Yongin-si (KR)

(72) Inventor: Hwanjin Kim, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/534,658

(22) Filed: Nov. 24, 2021

(65) Prior Publication Data

US 2022/0350367 A1    Nov. 3, 2022

(30) Foreign Application Priority Data

Apr. 29, 2021 (KR) .................. 10-2021-0055769

(51) Int. Cl.
*G06F 1/16* (2006.01)
(52) U.S. Cl.
CPC .......... *G06F 1/1652* (2013.01); *G06F 1/1641* (2013.01); *G06F 1/1656* (2013.01); *G06F 1/1681* (2013.01)
(58) Field of Classification Search
CPC .... G06F 1/1652; G06F 1/1641; G06F 1/1656; G06F 1/1681
See application file for complete search history.

(56) References Cited

U.S. PATENT DOCUMENTS

| | | | | |
|---|---|---|---|---|
| 10,878,728 B2* | 12/2020 | Yoon | ................ | G06F 1/1624 |
| 11,227,516 B1* | 1/2022 | Shin | ................ | G09F 9/30 |
| 11,277,503 B2* | 3/2022 | Choi | ................ | G06F 1/1624 |
| 2019/0363286 A1* | 11/2019 | Hu | ................ | G09F 9/301 |
| 2021/0150943 A1* | 5/2021 | Cui | ................ | G06F 1/1652 |
| 2021/0375167 A1* | 12/2021 | Lin | ................ | G06F 1/1652 |
| 2022/0039273 A1* | 2/2022 | Zhang | ................ | H04M 1/0237 |
| 2022/0263043 A1* | 8/2022 | Sunwoo | ................ | H10K 59/12 |
| 2022/0291713 A1* | 9/2022 | Zhang | ................ | G06F 1/1652 |
| 2022/0322553 A1* | 10/2022 | Zhang | ................ | H05K 5/0017 |

FOREIGN PATENT DOCUMENTS

| | | |
|---|---|---|
| KR | 10-2016-0148116 | 12/2016 |
| KR | 10-2017-0086321 | 7/2017 |
| KR | 10-1784880 | 10/2017 |
| KR | 10-2020-0084980 | 7/2020 |

* cited by examiner

*Primary Examiner* — Rockshana D Chowdhury
(74) *Attorney, Agent, or Firm* — KILE PARK REED & HOUTTEMAN PLLC

(57) ABSTRACT

A display device includes a first housing, a second housing facing the first housing, a flexible display module including a first display part and a second display part adjacent to the first display part, a protection glass disposed on a front surface of the display device, and including a glass having rigidity, the protection glass protecting the first display part, and a flexible support module supporting the flexible display module.

20 Claims, 10 Drawing Sheets

FIG. 5
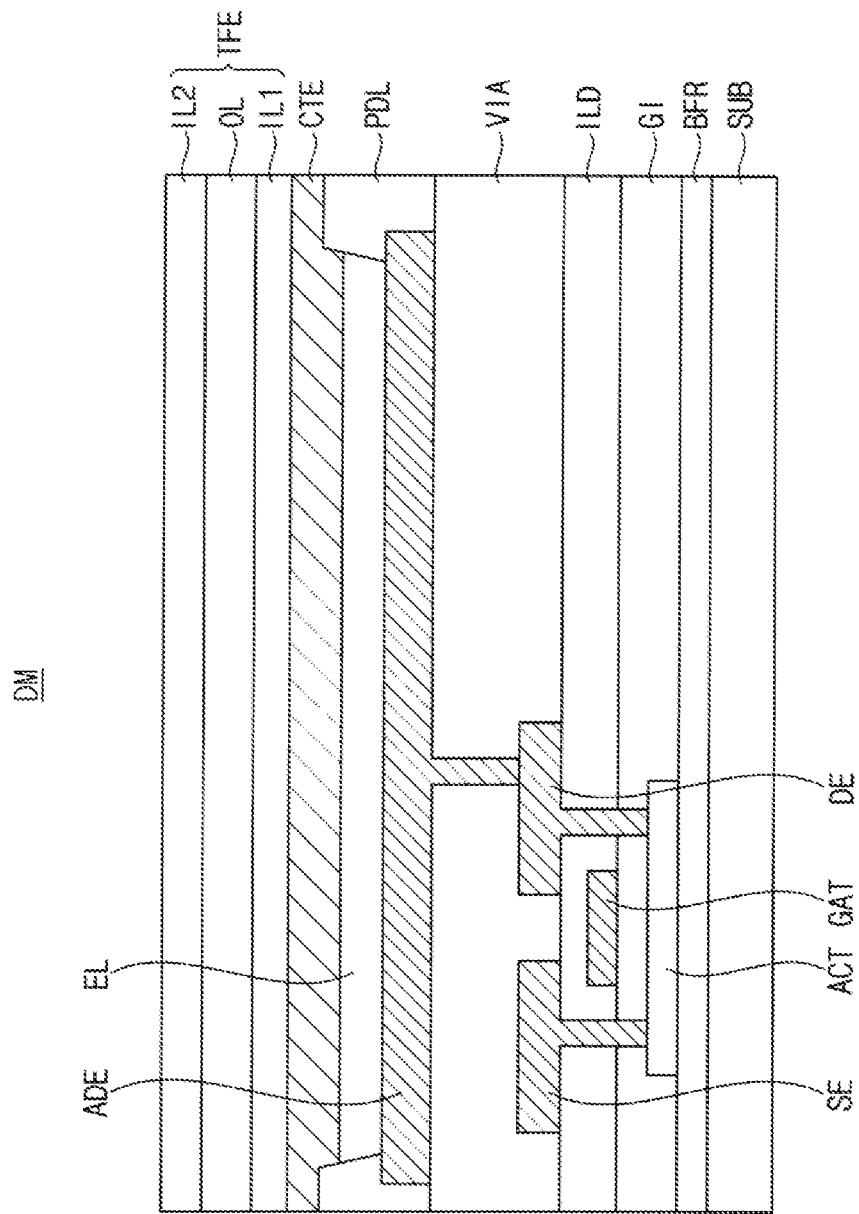
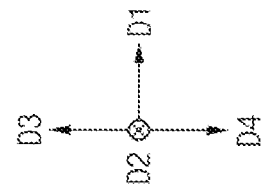

DISPLAY DEVICE

CROSS-REFERENCE TO RELATED APPLICATION(S)

This application claims priority to and benefits of Korean Patent Application No. 10-2021-0055769 under 35 U.S.C. § 119, filed on Apr. 29, 2021 in the Korean Intellectual Property Office, the entire contents of which are incorporated herein by reference.

BACKGROUND

1. Technical Field

Embodiments relate generally to a display device and to a display device including a flexible display module.

2. Description of the Related Art

Recently, a product using a flexible display device has appeared. The flexible display device refers to a display device that can be bent or folded. In order to implement the flexible display device, components (for example, a display module, a window, etc.) may be formed constituting the display device with a flexible material (for example, plastic).

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide a display device including a flexible display module.

A display device according to an embodiment may include a first housing; a second housing facing the first housing; a flexible display module disposed between the first housing and the second housing, the flexible display module including a first display part; and a second display part adjacent to the first display part; a protection glass disposed on a front surface of the display device, and including a glass having rigidity, the protection glass protecting the first display part; and a flexible support module disposed between the first housing and the second housing, the flexible support module supporting the flexible display module.

In an embodiment, the first display part may be exposed through the protection glass in a first mode and may be exposed through a rear surface of the display device in a second mode. The second display part may be accommodated by the flexible support module in the first mode, and may be exposed through the rear surface of the display device in the second mode.

In an embodiment, the flexible support module may be disposed on the rear surface of the display device in the first mode, and may support the second display part.

In an embodiment, the flexible support module may be disposed on the front surface of the display device in the second mode.

In an embodiment, the flexible support module may have flexibility.

In an embodiment, the flexible support module may include a plastic.

In an embodiment, the display device may further include a guide member connected to the flexible display module and guiding the first display part.

In an embodiment, the guide member may guide the first display part to face the second display part in the first mode.

In an embodiment, the guide member may guide the first display part and the second display part to be disposed on a same surface in the second mode.

A display device according to an embodiment may include a flexible display module including a first display part; a second display part adjacent to the first display part and folded from the first display part; and a third display part adjacent to the second display part and slid from the second display part; a housing accommodating the flexible display module and including a hinge; and a protection glass disposed on a front surface of the display device and including a glass having rigidity, the protection glass protecting the third display part.

In an embodiment, the first display part may face the second display part, and the third display part may be exposed through the protection glass in a first mode.

In an embodiment, the first display part may be exposed through the front surface of the display device in a second mode, the second display part and the first display part may be positioned on a same surface and the second display part may be exposed through the front surface of the display device, in the second mode, and the third display part may be disposed on a rear surface of the display device in the second mode.

In an embodiment, the first display part may be exposed through the front surface of the display device in a third mode, the second display part and the first display part may be disposed on a same surface the second display part may be exposed through the front surface of the display device in the third mode, and the third display part, the first display part, and the second display part may be disposed on a same surface, the third display part may be exposed through the front surface of the display device.

In an embodiment, the housing may include a first housing accommodating the first display part; a second housing connected to the first housing through the hinge and supporting a side of the protection glass; and a third housing supporting another side of the protection glass.

In an embodiment, the display device may further include a guide member connected to the flexible display module and guiding the third display part.

In an embodiment, the guide member may guide the third display part and the second display part to be disposed on a same surface.

Therefore, the display device according to example embodiments may be folded and/or slid. Even in case that the display device is folded, the flexible display module may display an image or images. Accordingly, portability and accessibility of the display device may be improved. The display device may include the protection glass, and the protection glass may include a glass having rigidity. Accordingly, in a state in which the display device is folded, the protection glass may protect the flexible display module from an external force. Accordingly, durability of the display device may be improved.

BRIEF DESCRIPTION OF THE DRAWINGS

The accompanying drawings, which are included to provide a further understanding of the disclosure and are incorporated in and constitute a part of this specification, illustrate embodiments, and together with the description serve to explain the disclosure, in which:

FIG. 5 is a schematic cross-sectional view illustrating a flexible display module included in the display device of FIG. 1.

DETAILED DESCRIPTION OF THE EMBODIMENTS

Figure 1:
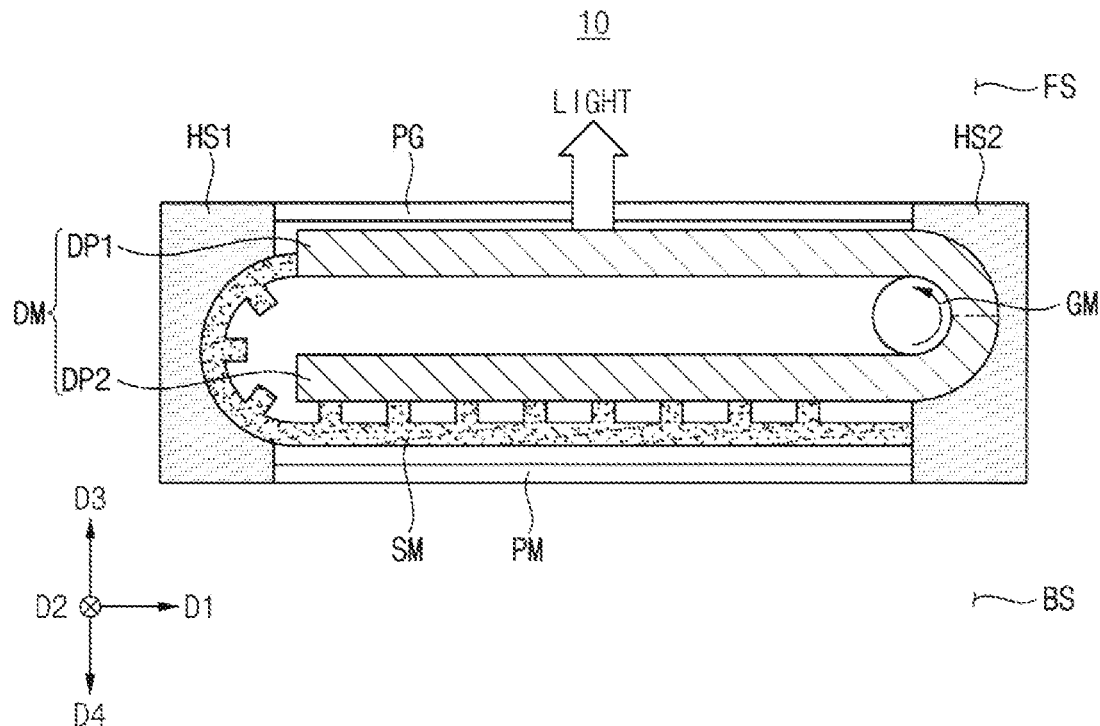
FIG. 1 is a schematic cross-sectional view illustrating a first mode of a display device according to an embodiment.

Illustrative, non-limiting embodiments will be more clearly understood from the following detailed description in conjunction with the accompanying drawings.

In the drawings, sizes, thicknesses, ratios, and dimensions of the elements may be exaggerated for ease of description and for clarity. Like numbers refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing embodiments only and is not intended to be limiting. As used herein, the singular forms "a," "an," and "the" are intended to include the plural forms, including "at least one," unless the content clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be further understood that the terms "comprises" and/or "comprising," or "includes" and/or "including" or "has", "have" and/or "having" and variations thereof when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the Figures is turned over, elements described as being on the "lower" side of other elements would then be oriented on "upper" sides of the other elements. The term "lower," can therefore, encompass both an orientation of "lower" and "upper," depending on the particular orientation of the Figure. Similarly, when the device in one of the Figures is turned over, elements described as "below" or "beneath" other elements would then be oriented "above" the other elements. The terms "below" or "beneath" can, therefore, encompass both an orientation of above and below.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used or implied herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Figure 2:
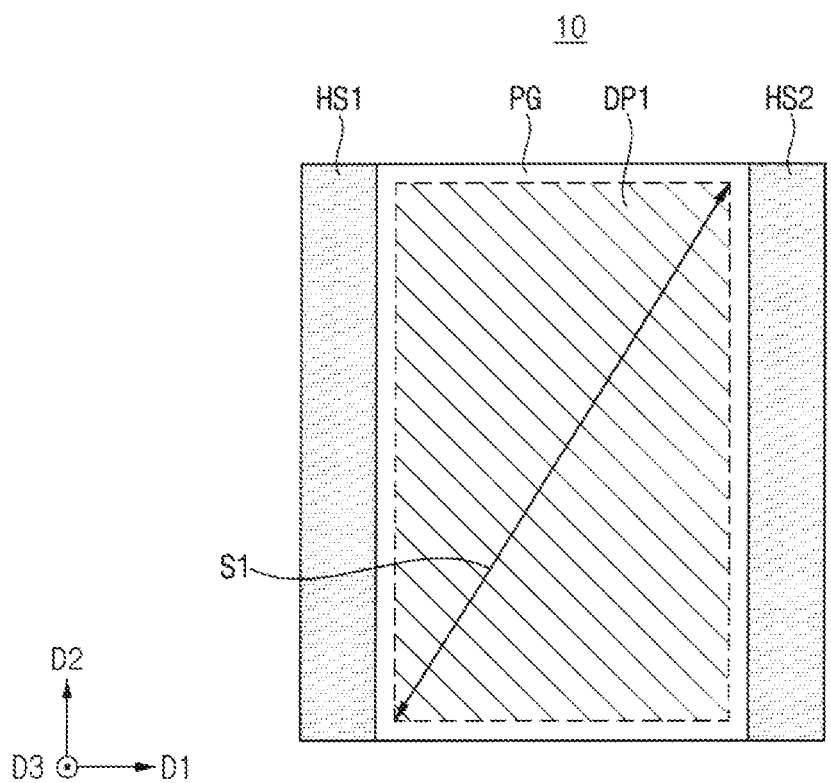
FIG. 2 is a schematic plan view illustrating the display device of FIG. 1 viewed from a front surface.

FIG. 1 is a schematic cross-sectional view illustrating a first mode of a display device according to an embodiment. FIG. 2 is a schematic plan view illustrating the display device of FIG. 1 viewed from a front surface.

Referring to FIG. 1, a display device 10 according to an embodiment may include a first housing HS1, a second housing HS2, a flexible display module DM, a protection glass PG, a flexible support module SM, a protection member PM, and a guide member GM.

The first housing HS1 and the second housing HS2 may face each other. The first housing HS1 and the second housing HS2 may be formed of a material having rigidity. In an embodiment, the first housing HS1 and the second housing HS2 may accommodate the flexible display module DM and the flexible support module SM. The first housing HS1 and the second housing HS2 may support the protection glass PG and the protection member PM.

The flexible display module DM may be disposed between the first housing HS1 and the second housing HS2. At least one light emitting diode and at least one transistor for driving the light emitting diode may be formed in the flexible display module DM. Accordingly, the flexible display module DM may emit light. The flexible display module DM may have flexibility. Accordingly, the flexible display module DM may be folded. A detailed structure of the flexible display module DM will be described with reference to FIG. 5.

In an embodiment, the flexible display module DM may include a first display part DP1 and a second display part DP2. The second display part DP2 may be adjacent to the first display part DP1.

The protection glass PG may be disposed between the first housing HS1 and the second housing HS2. The protection glass PG may be disposed on a front surface FS of the display device 10, and may protect the first display part DP1. For example, the protection glass PG may include a glass having rigidity. Accordingly, the protection glass PG may relatively further protect the first display part DP1 from an external force.

The flexible support module SM may be disposed between the first housing HS1 and the second housing HS2. The flexible support module SM may support the flexible display module DM. In an embodiment, the flexible support module SM may include plastic having flexibility. Accordingly, the flexible support module SM may be disposed on a rear surface BS of the display device 10 in a first mode or a first configuration (for example, a folding mode) and may be disposed on the front surface FS of the display device 10 in a second mode or a second configuration (for example, an unfolding mode).

The protection member PM may be disposed between the first housing HS1 and the second housing HS2. The protection member PM may be disposed on the rear surface BS of the display device 10 and may protect the second display part DP2. For example, the protection member PM may include a plastic having flexibility. Accordingly, a size of the protection member PM may vary. In other words, the protection member PM may be enlarged or reduced on a plane.

The guide member GM may be connected or coupled to the flexible display module DM. For example, the guide member GM may be disposed between the first display part DP1 and the second display part DP2. In an embodiment, the guide member GM may guide the first display part DP1. For example, the guide member GM may guide the first display part DP1 to face the second display part DP2 in the first mode. The guide member GM may guide the first display part DP1 to be positioned on a same surface as the second display part DP2 in the second mode.

Referring to FIGS. 1 and 2, in the first mode, the first display part DP1 may be exposed to the front surface FS through the protection glass PG. Accordingly, the first display part DP1 may emit light to the front surface FS.

In the first mode, the second display part DP2 may face the first display part DP1 by the guide member GM. The second display part DP2 may be accommodated by the flexible support module SM. The second display part DP2 may be deactivated.

As shown in FIG. 2, the first display part DP1 may extend in a first direction D1 (for example, the X direction) and a second direction D2 (for example, in the Y direction) perpendicular to the first direction D1. The flexible display module DM may be activated by a first size S1. For example, the first size S1 may be about 6 inches. In the first mode, the display device 10 may emit light in a third direction D3 (for example, the Z direction) perpendicular to the first and second directions D1 and D2.

In the first mode, the flexible support member SM may support the second display part DP2.

Figure 3:
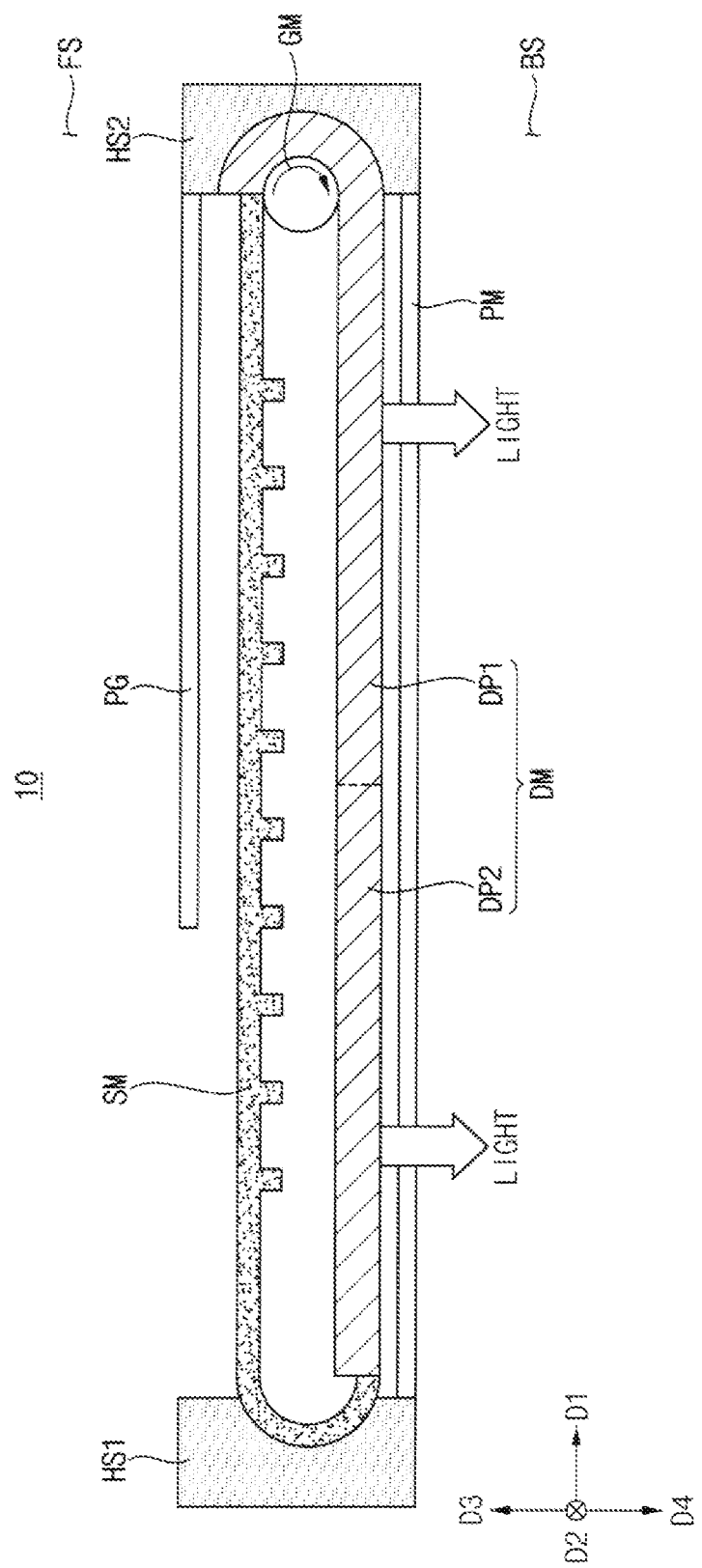
FIG. 3 is a schematic cross-sectional view illustrating a second mode of the display device of FIG. 1.
Figure 4:
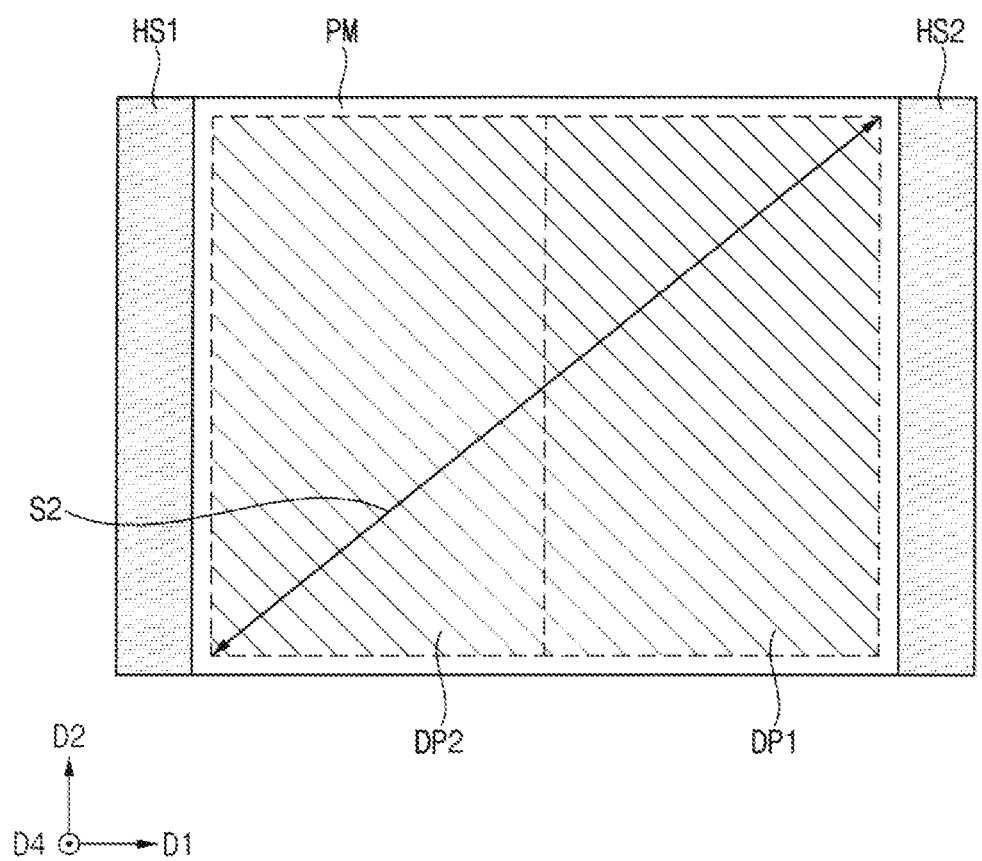
FIG. 4 is a schematic plan view illustrating the display device of FIG. 3 viewed from a rear surface.

FIG. 3 is a schematic cross-sectional view illustrating a second mode of the display device of FIG. 1. FIG. 4 is a schematic plan view illustrating the display device of FIG. 3 viewed from a rear surface.

Referring to FIGS. 3 and 4, in the second mode, the first display part DP1 may be exposed to the rear surface BS through the protection member PM. In other words, the guide member GM may guide the first display part DP1 to be positioned on a same surface as the second display part DP2. Accordingly, the first display part DP1 may emit light to the rear surface BS.

In the second mode, the second display part DP2 may be exposed to the rear surface BS through the protection member PM. Accordingly, the second display part DP2 may emit light to the rear surface BS.

Referring to FIG. 4, the first and second display parts DP1 and DP2 may extend in the first direction D1 and the second direction D2. The second display part DP2 may be adjacent to the first display part DP1 in the first direction D1. The flexible display module DM may be activated by a second size S2. For example, the second size S2 may be about 8 inches. In the second mode, the display device 10 may emit light in a fourth direction D4 (for example, the –Z direction) opposite to the third direction D3.

FIG. 5 is a schematic cross-sectional view illustrating a flexible display module included in the display device of FIG. 1.

Referring to FIG. 5, the flexible display module DM may include a substrate SUB, a buffer layer BFR, an active pattern ACT, a gate insulating layer GI, a gate electrode GAT, an interlayer insulating layer ILD, a source electrode SE, a drain electrode DE, a via insulating layer VIA, a first electrode ADE, an emission layer EL, a second electrode CTE, and an encapsulation layer TFE. The encapsulation layer TFE may include a first inorganic layer ILL an organic layer OL, and a second inorganic layer IL2.

The substrate SUB may be formed of plastic having flexibility. Examples of the plastic that can be used for the substrate SUB may be polyethylene terephthalate, polyethylene naphthalate, polyetherketone, polycarbonate, polyarylate, polyethersulfone, polyimide, and the like within the spirit and the scope of the disclosure. These may be used alone or in combination with each other. The substrate SUB may include plastic layers and barrier layers disposed between the plastic layers. The barrier layers may be formed of an inorganic material. Examples of the inorganic material that can be used as the barrier layers may be silicon oxide ("$SiO_x$"), silicon nitride ("$SiN_x$"), silicon oxynitride ("$SiO_N$"), and the like within the spirit and the scope of the disclosure. These may be used alone or in combination with each other.

The buffer layer BFR may be disposed on the substrate SUB. The buffer layer BFR may be formed of an inorganic material. The buffer layer BFR may prevent diffusion of metal atoms or impurities from the substrate SUB into the active pattern ACT. In an embodiment, the buffer layer BFR may control a heat transfer rate during a crystallization process for forming the active pattern ACT.

The active pattern ACT may be disposed on the buffer layer BFR. In an embodiment, the active pattern ACT may be formed of a silicon semiconductor or an oxide semiconductor.

Examples of the material that can be used for the silicon semiconductor may be amorphous silicon, polycrystalline silicon, and the like within the spirit and the scope of the disclosure. These may be used alone or in combination with each other.

Examples of materials that can be used as the oxide semiconductor may be zinc oxide ("$ZnO_x$"), gallium oxide ("$GaO_x$"), titanium oxide ("$TiO_x$"), tin oxide ("$SnO_x$"), indium oxide ("$InO_x$"), indium-gallium oxide ("IGO"), indium-zinc oxide ("IZO"), indium-tin oxide ("ITO"), gallium-zinc oxide ("GZO"), zinc-magnesium oxide ("ZMO"), zinc-tin oxide ("ZTO"), zinc-zirconium oxide ("$ZnZr_xO_y$"), indium-gallium-zinc oxide ("IGZO"), indium-zinc-tin oxide ("IZTO"), indium-gallium-hafnium oxide ("IGHO"), tin-aluminum-zinc oxide ("TAZO"), indium-gallium-tin oxide ("IGTO"), etc. within the spirit and the scope of the disclosure. These may be used alone or in combination with each other.

The gate insulating layer GI may cover or overlap the active pattern ACT and may be disposed on the buffer layer BFR. The gate insulating layer GI may be formed of an insulating material. Examples of the insulating material that may be used as the gate insulating layer GI may be silicon oxide ("$SiO_x$"), silicon nitride ("$SiN_x$"), silicon oxynitride ("$SiO_N$"), or the like within the spirit and the scope of the disclosure. These may be used alone or in combination with each other.

The gate electrode GAT may be disposed on the gate insulating layer GI. The gate electrode GAT may be formed of a metal, an alloy, a conductive metal oxide, a transparent conductive material, or the like within the spirit and the scope of the disclosure. Examples of the material that can be used as the gate electrode GAT may be silver ("Ag"), an alloy containing silver, molybdenum ("Mo"), an alloy containing molybdenum, aluminum ("Al"), alloys containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), and the like within the spirit and the scope of the disclosure. These may be used alone or in combination with each other.

The interlayer insulating layer ILD may cover or overlap the gate electrode GAT and may be disposed on the gate insulating layer GI. The interlayer insulating layer ILD may be formed of an insulating material.

The source electrode SE and the drain electrode DE may be disposed on the interlayer insulating layer ILD. The source electrode SE and the drain electrode DE may contact the active pattern ACT. The source electrode SE and the drain electrode DE may be formed of a metal, an alloy, a conductive metal oxide, a transparent conductive material, or the like within the spirit and the scope of the disclosure.

The via insulating layer VIA may cover or overlap the source electrode SE and the drain electrode DE, and may be disposed on the interlayer insulating layer ILD. The via insulating layer VIA may be formed of an organic insulating material. Examples of the material that can be used as the via insulating layer VIA may be photoresist, polyacrylic resin, polyimide resin, acrylic resin, etc. within the spirit and the scope of the disclosure. These may be used alone or in combination with each other.

The first electrode ADE may be disposed on the via insulating layer VIA and may contact the drain electrode DE. The first electrode ADE may be formed of a metal, an alloy, a conductive metal oxide, a transparent conductive material, or the like within the spirit and the scope of the disclosure.

The pixel defining layer PDL may be disposed on the via insulating layer VIA. An opening exposing the first electrode ADE may be formed in the pixel defining layer PDL. The pixel defining layer PDL may be formed of an organic material. Examples of the material that can be used as the pixel defining layer PDL may be photoresist, polyacrylic resin, polyimide resin (for example, photosensitive polyimide resin ("PSPI"), acrylic resin, and the like within the spirit and the scope of the disclosure. These may be used alone or in combination with each other.

The emission layer EL may be disposed on the first electrode ADE. The emission layer EL may further include a hole injection layer, a hole transport layer, an electron transport layer, and an electron injection layer. The emission layer EL may generate light based on a voltage difference between the first electrode ADE and the second electrode CTE.

The second electrode CTE may be disposed on the emission layer EL. The second electrode CTE may be formed of a metal, an alloy, a conductive metal oxide, a transparent conductive material, or the like within the spirit and the scope of the disclosure.

The first electrode ADE, the emission layer EL, and the second electrode CTE may constitute an organic light emitting diode.

The encapsulation layer TFE may be disposed on the second electrode CTE. The encapsulation layer TFE may prevent penetration of oxygen and/or moisture into the emission layer EL. The first inorganic layer IL1 and the second inorganic layer IL2 may be formed of an inorganic material. The organic layer OL may be disposed between the first and second inorganic layers IL1 and IL2 and may be formed of an organic material. At least one inorganic layer and at least one organic layer may be further stacked on the encapsulation layer TFE.

Figure 6:
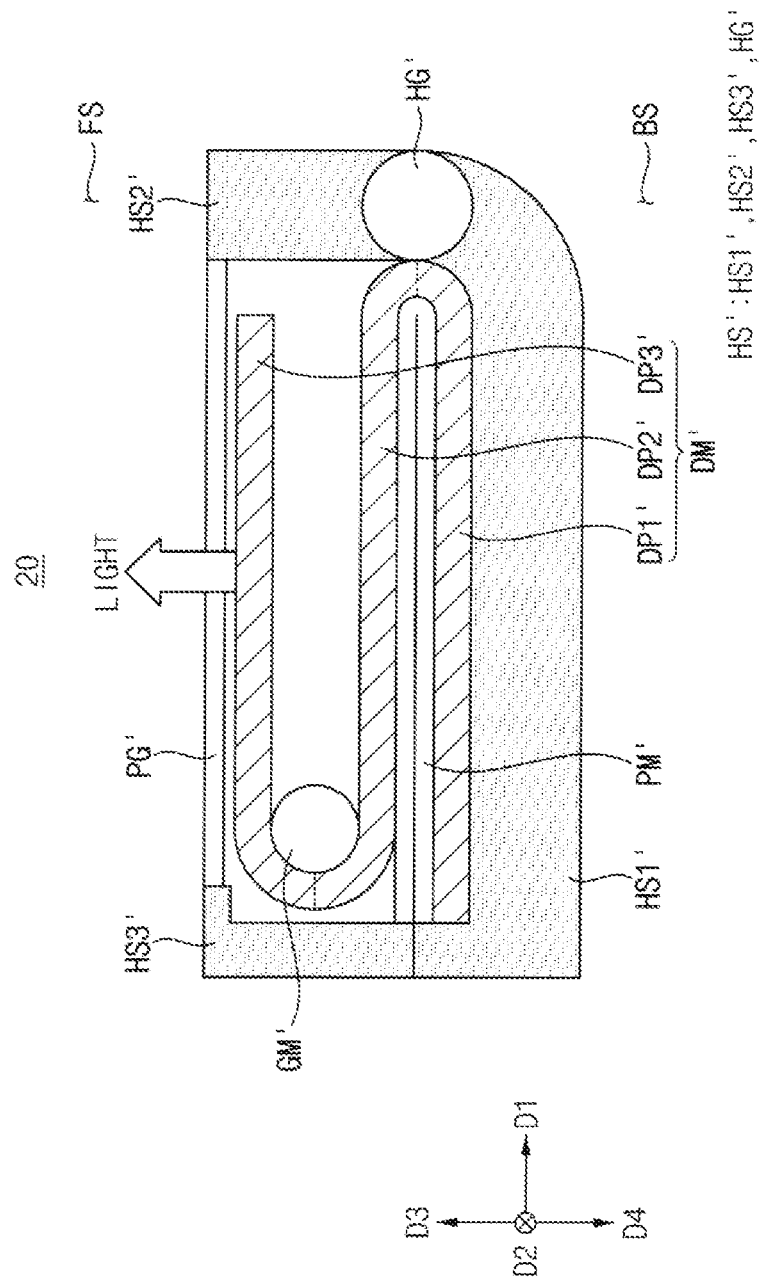
FIG. 6 is a schematic cross-sectional view illustrating a first mode of a display device according to an embodiment.
Figure 7:
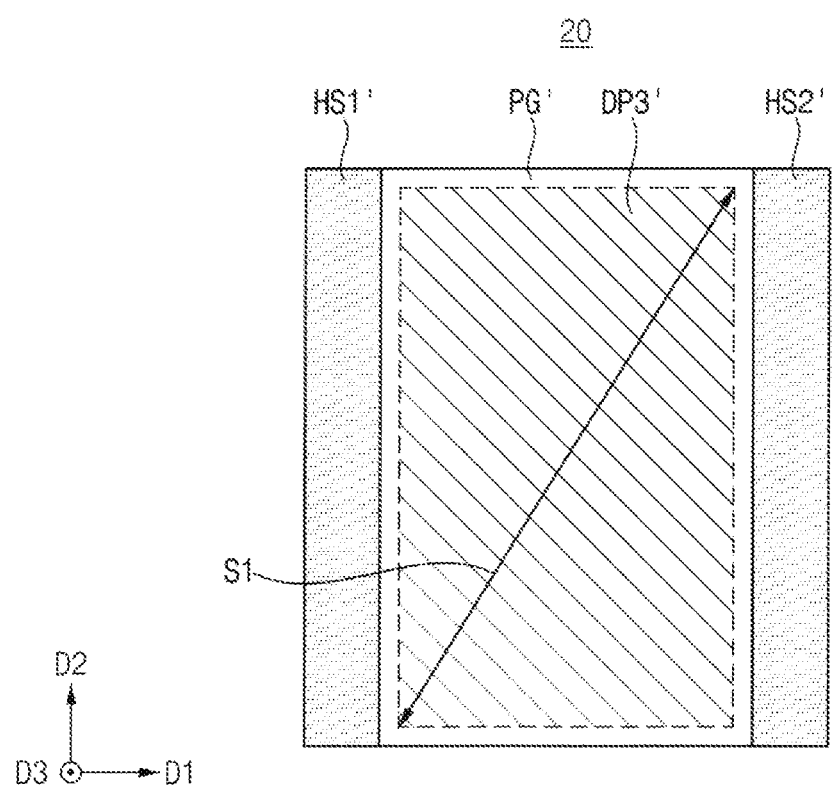
FIG. 7 is a schematic plan view illustrating the display device of FIG. 6 viewed from a front surface.

FIG. 6 is a schematic cross-sectional view illustrating a first mode of a display device according to an embodiment. FIG. 7 is a schematic plan view illustrating the display device of FIG. 6 viewed from a front surface.

Referring to FIG. 6, a display device 20 according to an embodiment may include a housing HS', a flexible display module DM', a protection glass PG', a protection member PM', and a guide member GM. The housing HS' may include a first housing HS1', a second housing HS2', a third housing HS3', and a hinge HG'. The flexible display module DM' may include a first display part DP1', a second display part DP2', and a third display part DP3'.

The housing HS' may be formed of a material having rigidity and may accommodate the flexible display module DM'. In an embodiment, the first display part DP1' may be accommodated in the first housing HS1'. The second housing HS2' may be connected or coupled to the first housing HS1' through the hinge HG', and may support one side or a side of the protection glass PG'. The third housing HS3' may support the other side of the protection glass PG'.

The flexible display module DM' may be accommodated in a space defined by the housing HS'. At least one light emitting diode and at least one transistor for driving the light emitting diode may be formed in the flexible display module DM'. Accordingly, the flexible display module DM' may emit light. The flexible display module DM' may have flexibility. Accordingly, the flexible display module DM' may be folded and may be slid. However, a structure of the flexible display module DM' may be substantially the same as the structure of the flexible display module DM described with reference to FIG. 5.

The flexible display module DM' may include a first display part DP1', a second display part DP2', and a third display part DP3'. The second display part DP2' may be adjacent to the first display part DP1', and the third display part DP3' may be adjacent to the second display part DP2'.

In an embodiment, the second display part DP2' may be folded from the first display part DP1'. The third display part DP3' may be slid from the second display part DP2'.

The protection glass PG' may be disposed between the second housing HS2' and the third housing HS3'. The protection glass PG' may be disposed on the front surface FS of the display device 20 and may protect the third display part DP3'. For example, the protection glass PG' may include glass having rigidity. Accordingly, the protection glass PG' may relatively further protect the third display part DP3 from an external force.

The protection member PM' may include plastic having flexibility. Accordingly, the size of the protection member PM' may vary. In other words, the protection member PM' may be enlarged or reduced on a plane. Accordingly, the protection member PM' may protect the first and second display parts DP1' and DP2' in a first mode (for example, a folding mode) and a second mode (for example an unfolding mode). The protection member PM' may protect the first to third display parts DP1', DP2', and DP3' in a third mode or a third configuration (for example, a sliding mode).

The guide member GM' may be connected or coupled to the flexible display module DM'. For example, the guide member GM' may be disposed between the second display part DP2' and the third display part DP3'. In an embodiment, the guide member GM' may guide the third display part DP3'. For example, the guide member GM' may guide the third display part DP3' to be positioned on the front surface FS in the first mode. The guide member GM' may guide the third display part DP3' to be positioned on the rear surface BS in the second mode. The guide member GM' may guide the third display part DP3' to be positioned on a same surface as the second display part DP2' in the third mode.

Referring to FIGS. 6 and 7, in the first mode, the first display part DP1' may face the second display part DP2'. The first and second display parts DP1' and DP2' may be deactivated. The protection member PM' may be disposed between the first display part DP1' and the second display part DP2'.

In the first mode, the third display part DP3' may be exposed to the front surface FS through the protection glass PG'. Accordingly, the third display part DP3' may emit light toward the front surface FS.

As shown in FIG. 7, the third display part DP3' may extend in the first direction D1 and the second direction D2. The flexible display module DM' may be activated by a first size S1. For example, the first size S1 may be about 6 inches. In the first mode, the display device 20 may emit light in the third direction D3.

Figure 8:
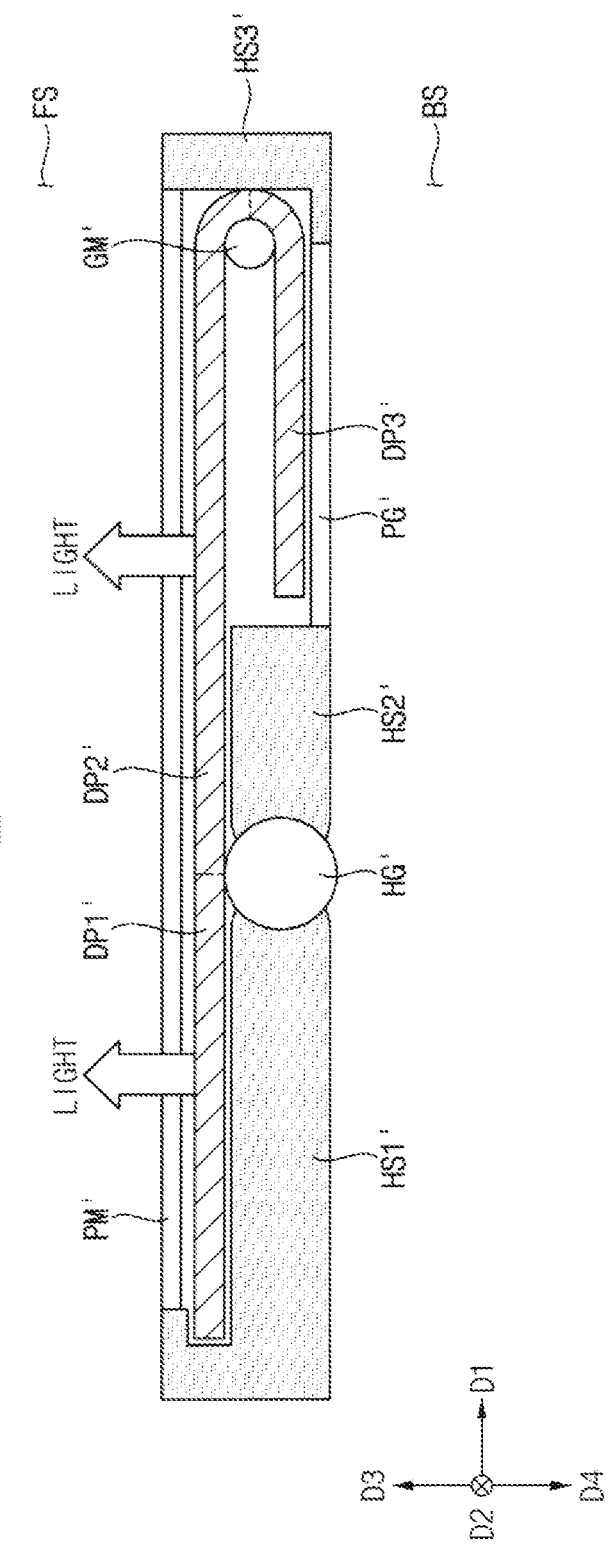
FIG. 8 is a schematic cross-sectional view illustrating a second mode of the display device of FIG. 6.
Figure 9:
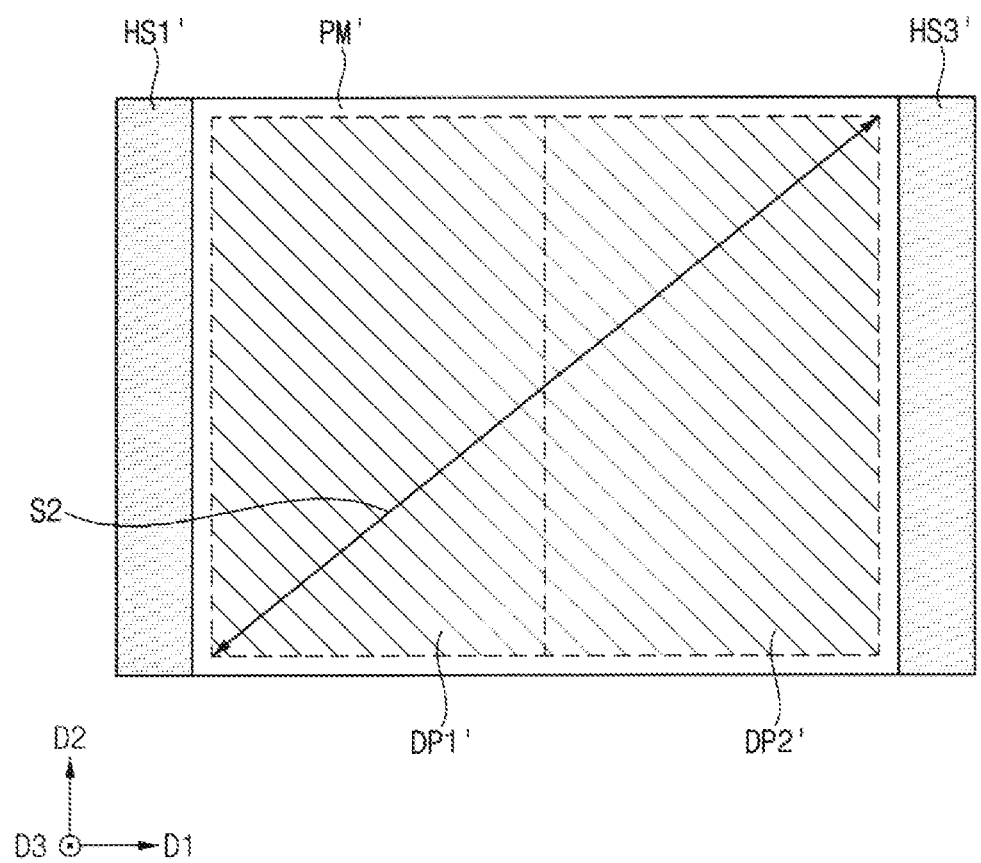
FIG. 9 is a schematic plan view illustrating the display device of FIG. 8 viewed from the front surface.

FIG. 8 is a schematic cross-sectional view illustrating a second mode of the display device of FIG. 6. FIG. 9 is a schematic plan view illustrating the display device of FIG. 8 viewed from the front surface.

Referring to FIGS. 8 and 9, in the second mode, the display device 20 may be unfolded by the hinge HG'.

In the second mode, the first display part DP1' may be exposed to the front surface FS through the protection member PM'. Accordingly, the first display part DP1' may emit light toward the front surface FS.

In the second mode, the second display part DP2' may be exposed to the front surface FS through the protection member PM'. The second display part DP2' may be positioned on a same surface as the first display part DP1'. Accordingly, the second display part DP2' may emit light toward the front surface FS.

In the second mode, the third display part DP3' may be disposed on the rear surface BS. Accordingly, the third display part DP3' may be deactivated.

As shown in FIG. 9, the first and second display parts DP1' and DP2' may extend in the first direction D1 and the second direction D2. The second display part DP2' may be adjacent to the first display part DP1' in the first direction D1. The flexible display module DM' may be activated by a second size S2. For example, the second size S2 may be about 8 inches. In the second mode, the display device 20 may emit light in the third direction D3.

Figure 10:
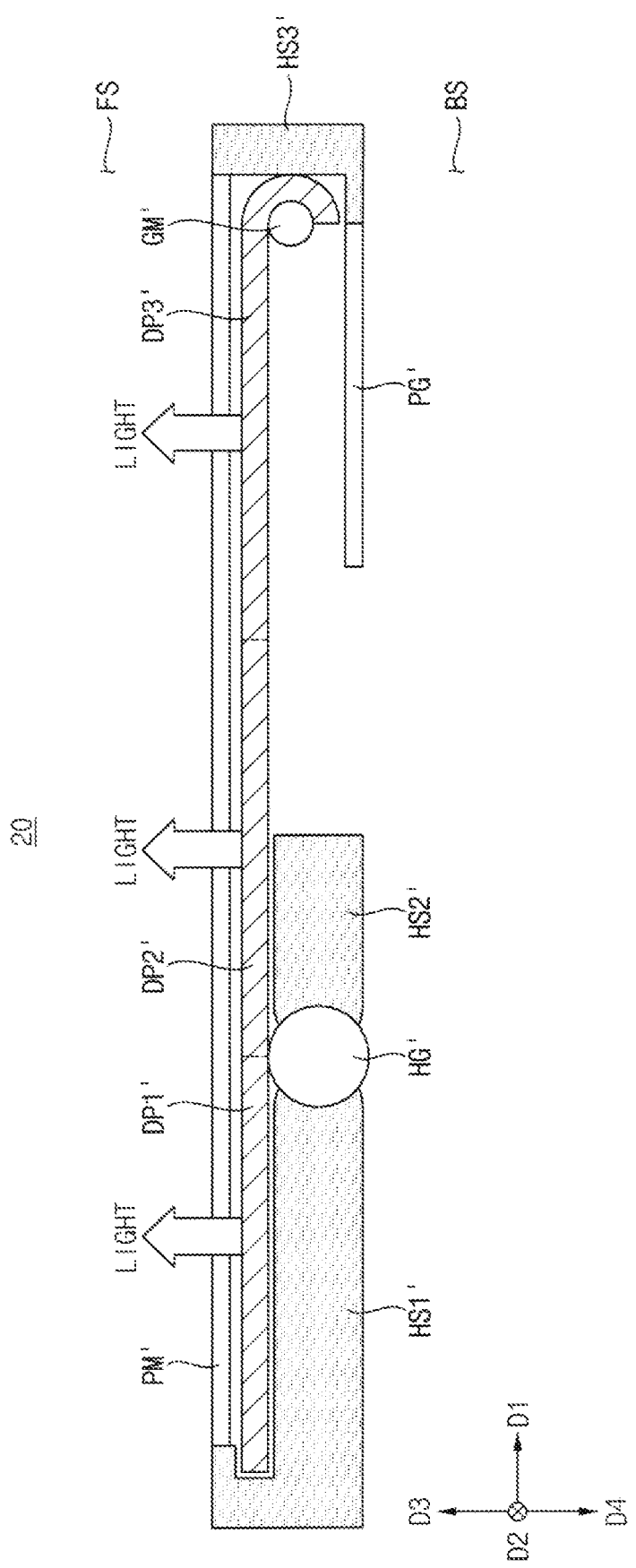
FIG. 10 is a schematic cross-sectional view illustrating a third mode of the display device of FIG. 6.
Figure 11:
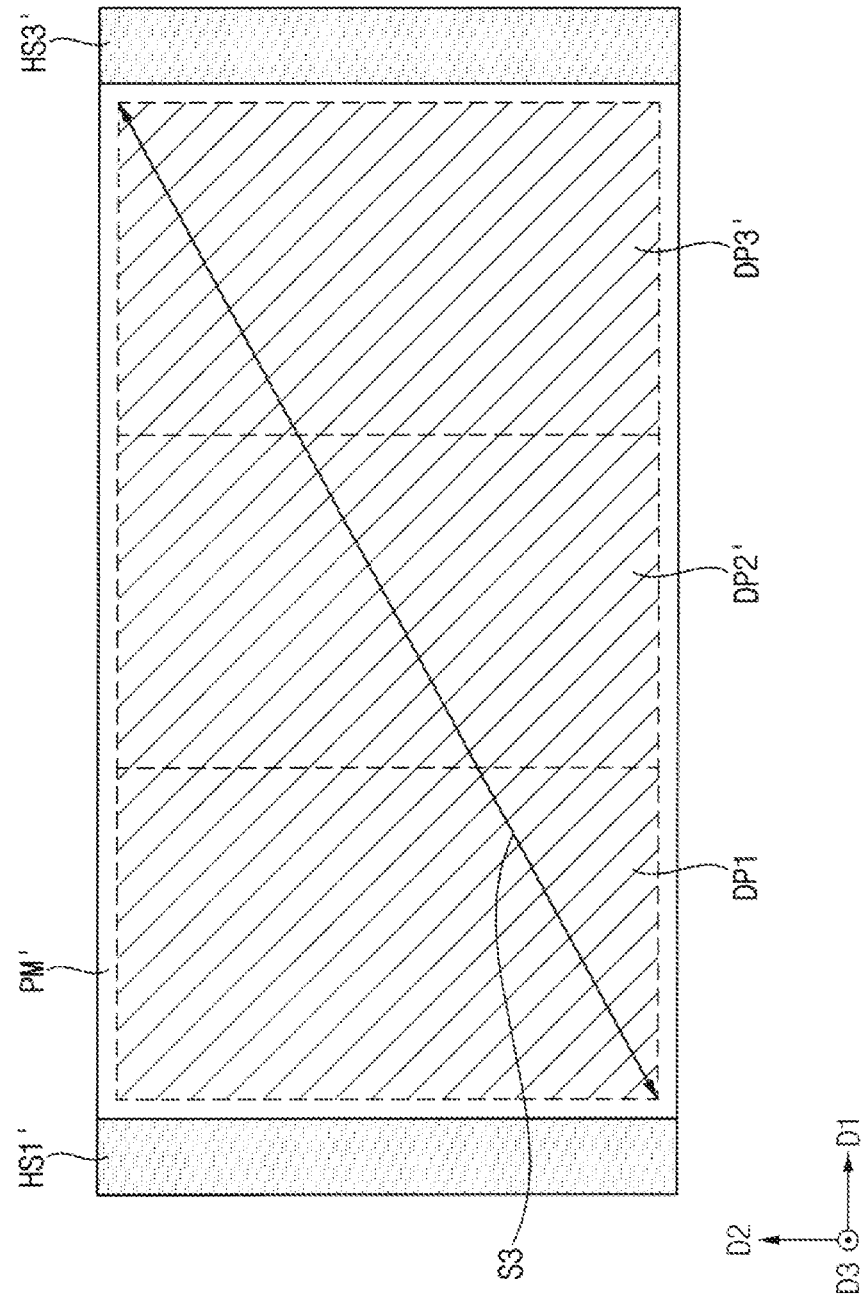
FIG. 11 is a schematic plan view illustrating the display device of FIG. 10 viewed from the front surface.

FIG. 10 is a schematic cross-sectional view illustrating a third mode of the display device of FIG. 6. FIG. 11 is a schematic plan view illustrating the display device of FIG. 10 viewed from the front surface.

Referring to FIGS. 10 and 11, in the third mode, the display device 30 may be slid by the guide member GM.

In the third mode, the first display part DP1' and the second display part DP2' may be positioned on a same surface and may be exposed to the front surface FS through the protection member PM'. Accordingly, the first display part DP1' and the second display part DP2' may emit light toward the front surface FS.

In the third mode, the third display part DP3' may be positioned on a same surface as the first display part DP1' and the second display part DP2', and may be exposed to the front surface FS through the protection member PM'. Accordingly, the third display part DP3' may emit light toward the front surface FS.

As shown in FIG. 11, the first to third display parts DP1', DP2', and DP3' may extend in the first direction D1 and the second direction D2. The second display part DP2' may be adjacent to the first display part DP1' in the first direction D1, and the third display part DP3' may be adjacent to the second display part DP2' in the first direction D1. The flexible display module DM' may be activated by a third size S3. For example, the third size S3 may be about 10.5 inches. In the third mode, the display device 20 may emit light in the third direction D3.

The display device 10 or 20 according to example embodiments may be folded and/or slid. Even in case that the display device 10 or 20 is folded, the flexible display module DM or DM' may display image. Accordingly, portability and accessibility of the display device 10 or 20 may be improved. The display device 10 or 20 may include the protection glass PG or PG', and the protection glass PG or PG may include a glass having rigidity. Accordingly, in a state in which the display device 10 or 20 is folded, the protection glass PG or PG' may protect the flexible display module DM or DM' from the external force. Accordingly, durability of the display device 10 or 20 may be improved.

Although embodiments and implementations have been described herein, other embodiments and modifications will be apparent from this description. Accordingly, the disclosure is not limited to such embodiments, but rather various modifications and equivalent arrangements will be apparent to a person of ordinary skill in the art.

What is claimed is:

1. A display device comprising:
   a first housing;
   a second housing facing the first housing;
   a flexible display module disposed between the first housing and the second housing, the flexible display module including:
      a first display part; and
      a second display part adjacent to the first display part;
   a protection glass disposed on a front surface of the display device and including a glass having rigidity, the protection glass protecting the first display part; and
   a flexible support module disposed between the first housing and the second housing, the flexible support module supporting the flexible display module, wherein the protection glass is not adhered to the flexible display module, wherein
   the first display part is exposed through the protection glass in a first mode, and is exposed through a rear surface of the display device in a second mode.

2. The display device of claim 1, wherein
   the second display part is accommodated by the flexible support module in the first mode, and is exposed through the rear surface of the display device in the second mode.

3. The display device of claim 2, wherein the flexible support module is disposed on the rear surface of the display device in the first mode, and supports the second display part.

4. The display device of claim 2, wherein the flexible support module is disposed on the front surface of the display device in the second mode.

5. The display device of claim 1, wherein the flexible support module has flexibility.

6. The display device of claim 5, wherein the flexible support module includes a plastic.

7. The display device of claim 1, further comprising:
   a guide member connected to the flexible display module and guiding the first display part.

8. The display device of claim 7, wherein the guide member guides the first display part to face the second display part in the first mode.

9. The display device of claim 7, wherein the guide member guides the first display part and the second display part to be disposed on a same surface in the second mode.

10. A display device, comprising:
    a flexible display module including:
       a first display part;
       a second display part adjacent to the first display part and folded from the first display part; and
       a third display part adjacent to the second display part and slid from the second display part;
    a housing accommodating the flexible display module and including a hinge; and
    a protection glass disposed on a front surface of the display device and including a glass having rigidity, the protection glass protecting the third display part, wherein the protection glass is not adhered to the flexible display module.

11. The display device of claim 10, wherein
    the first display part faces the second display part, and
    the third display part is exposed through the protection glass in a first mode.

12. The display device of claim 10, wherein
    the first display part is exposed through the front surface of the display device in a second mode,
    the second display part and the first display part are disposed on a same surface, the second display part being exposed through the front surface of the display device in the second mode, and
    the third display part is disposed on a rear surface of the display device in the second mode.

13. The display device of claim 10, wherein
    the first display part is exposed through the front surface of the display device in a third mode,
    the second display part and the first display part are disposed on a same surface, the second display part being exposed through the front surface of the display device in the third mode, and
    the third display part, the first display part, and the second display part are disposed on a same surface, the third display part being exposed through the front surface of the display device in the third mode.

14. The display device of claim 10, wherein the housing comprises:
    a first housing accommodating the first display part;
    a second housing connected to the first housing through the hinge and supporting a side of the protection glass; and
    a third housing supporting another side of the protection glass.

15. The display device of claim 10, further comprising:
    a guide member connected to the flexible display module and guiding the third display part.

16. The display device of claim 15, wherein the guide member guides the third display part and the second display part to be disposed on a same surface in the third mode.

17. The display device of claim 2, wherein the second display part is deactivated in the first mode.

18. The display device of claim 10, wherein the first and second display parts are deactivated in the first mode.

19. The display device of claim 12, wherein the third display part is deactivated in the second mode.

20. The display device of claim 10, wherein the housing directly contacts the protection glass.

* * * * *